(12) United States Patent
Heo et al.

(10) Patent No.: US 10,911,067 B2
(45) Date of Patent: Feb. 2, 2021

(54) METHOD AND APPARATUS FOR GENERATING QUANTUM ERROR CORRECTION CODE USING GRAPH STATE

(71) Applicant: KOREA UNIVERSITY RESEARCH AND BUSINESS FOUNDATION, Seoul (KR)

(72) Inventors: Jun Heo, Seoul (KR); Il Kwon Sohn, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 90 days.

(21) Appl. No.: 16/309,281

(22) PCT Filed: Jun. 24, 2016

(86) PCT No.: PCT/KR2016/006809
§ 371 (c)(1),
(2) Date: Dec. 12, 2018

(87) PCT Pub. No.: WO2017/217577
PCT Pub. Date: Dec. 21, 2017

(65) Prior Publication Data
US 2019/0199373 A1 Jun. 27, 2019

(30) Foreign Application Priority Data
Jun. 13, 2016 (KR) .................. 10-2016-0073350

(51) Int. Cl.
*H03M 13/11* (2006.01)
*H03M 13/29* (2006.01)
(Continued)

(52) U.S. Cl.
CPC ........ *H03M 13/1108* (2013.01); *G06N 5/003* (2013.01); *G06N 10/00* (2019.01);
(Continued)

(58) Field of Classification Search
CPC ..... B82Y 10/00; G06F 16/9024; G06F 17/10; G06F 17/16; H03M 13/615; H03M 13/11;
(Continued)

(56) References Cited

U.S. PATENT DOCUMENTS 9,858,531 B1 * 1/2018 Monroe ................. G06F 15/76
2017/0264434 A1 * 9/2017 Takahashi ............. H04L 9/0643

OTHER PUBLICATIONS

Hein et al., Entanglement in Graph States and its Applications, Feb. 11, 2006, Proceedings of the International School of Physics "Enrico Fermi" on "Quantum Computers, Algorithms and Chaos", Cornell University. (Year: 2006).*

* cited by examiner

*Primary Examiner* — April Y Blair
*Assistant Examiner* — Sazzad Hossain
(74) *Attorney, Agent, or Firm* — Hauptman Ham, LLP (57) ABSTRACT

Provided is a quantum error correction code generating method using a graph state. According to the exemplary embodiment of the present invention, a quantum error correction code generating method using a graph state: includes: generating a graph state representing an adjacency relationship between a plurality of qubits including at least one entangled qubit (ebit); generating a first stabilizer generator which corresponds to the graph state and is configured by a plurality of stabilizers for detecting errors of the plurality of qubits; and generating at least one logical Z operator used for a phase flip operation of a codeword, at least one logical X operator used for a bit flip operation of a codeword, and a second stabilizer generator which is a sub set of the first stabilizer generator, based on the first stabilizer generator and the at least one entangled qubit.

11 Claims, 5 Drawing Sheets

(51) Int. Cl.
    *G06N 5/00*     (2006.01)
    *G06N 10/00*    (2019.01)
    *H03M 13/00*    (2006.01)
    *G06F 17/16*        (2006.01)
    *B82Y 10/00*        (2011.01)
    *G06F 16/901*       (2019.01)
    *H04L 9/08*         (2006.01)
    *G06F 17/10*        (2006.01)

(52) U.S. Cl.
    CPC ........... *H03M 13/11* (2013.01); *H03M 13/29* (2013.01); *H03M 13/616* (2013.01); *B82Y 10/00* (2013.01); *G06F 16/9024* (2019.01); *G06F 17/10* (2013.01); *G06F 17/16* (2013.01); *H03M 13/1191* (2013.01); *H03M 13/615* (2013.01); *H04L 9/0852* (2013.01)

(58) Field of Classification Search
    CPC ............... H03M 13/29; H03M 13/616; H03M 13/1191; H04L 9/0852; G06N 10/00; G06N 5/003
    See application file for complete search history.

$$\begin{bmatrix} 0 & 1 & 0 & 0 & 1 & 0 \\ 1 & 0 & 1 & 0 & 0 & 0 \\ 0 & 1 & 0 & 1 & 0 & 0 \\ 0 & 0 & 1 & 0 & 1 & 0 \\ 1 & 0 & 0 & 1 & 0 & 1 \\ 0 & 0 & 0 & 0 & 1 & 0 \end{bmatrix}$$

$$\begin{bmatrix} 0 & 1 & 0 & 1 & 0 & 0 & 0 \\ 1 & 0 & 1 & 0 & 0 & 0 & 0 \\ 0 & 1 & 0 & 1 & 0 & 0 & 0 \\ 0 & 0 & 1 & 0 & 1 & 1 & 0 \\ 1 & 0 & 0 & 1 & 0 & 0 & 1 \\ 0 & 0 & 0 & 1 & 0 & 0 & 0 \\ 0 & 0 & 0 & 0 & 1 & 0 & 0 \end{bmatrix}$$

[FIG. 8]

METHOD AND APPARATUS FOR GENERATING QUANTUM ERROR CORRECTION CODE USING GRAPH STATE

TECHNICAL FIELD

The present invention relates to a method and an apparatus for generating a quantum error correction code using a graph status, and more particularly, to a method and an apparatus for generating an error correction code whose dimension is extended by including entangled qubits in the graph state.

BACKGROUND ART

A quantum information communication technology is a new technology which emerged at the end of the 20th century and relates to a process of storing, transmitting, and processing information based on the principle of quantum physics. In the quantum information communication technology, quantum physics and information communication technology are fused.

A quantum error correction code is introduced and used to protect quantum information which is very vulnerable to interference of external environments and has a self-colliding characteristic unlike the classical binary information.

When entangled qubits which is shared in a transmitter and a receiver is used, advantages in that a dimension of the error correction code is extended or a minimum distance is increased are widely known through studies, but the method is very complex.

Therefore, proposed are a method and an apparatus for generating the quantum error correction code which are capable of easily extending a dimension of the code by adding the entangled qubits to a graph state and selecting a stabilizer generator to be used.

DISCLOSURE

Technical Problem

An object of the present invention is to provide a method for easily extending a dimension of a quantum error correction code by adding entangled qubits to a graph state to generate a quantum error correction code.

Technical Solution

In order to achieve the above-mentioned object, according to the present invention, a quantum error correction code generating method using a graph state: includes: generating a graph state representing an adjacency relationship between a plurality of qubits including at least one entangled qubit (ebit); generating a first stabilizer generator which corresponds to the graph state and is configured by a plurality of stabilizers for detecting errors of the plurality of qubits; and generating at least one logical Z operator used for a phase flip operation of a codeword, at least one logical X operator used for a bit flip operation of a codeword, and a second stabilizer generator which is a sub set of the first stabilizer generator, based on the first stabilizer generator and the at least one entangled qubit.

Desirably, the generating of a second stabilizer generator may include: determining at least one of the plurality of stabilizers which configures the first stabilizer generator as the at least one logical Z operator and generating the second stabilizer generator with a remainder, based on the at least one entangled qubit; and generating the at least one logical X operator using the at least one logical Z operator and the second stabilizer generator.

Desirably, the generating of the second stabilizer generator with the remainder may include: determining at least one stabilizer including an X operator used for a bit flip operation in a position corresponding to the at least one entangled qubit, among the plurality of stabilizers which configures the first stabilizer generator, as the at least one logical Z operator; and generating the second stabilizer generator configured by a remainder excluding the at least one logical Z operator.

Desirably, the generating of the at least one logical X operator may include: generating at least one candidate operator in which the X operator included in the at least one logical Z operator is replaced with a Z operator used for a phase flip operation of a qubit; and generating the at least one logical X operator using a stabilizer including the Z operator in the same position as the at least one candidate operator in the second stabilizer generator and the at least one candidate operator.

Desirably, the at least one logical X operator may be calculated by Equation 1.

$$\bar{X} = X_j Z^{r_i} | I \text{ for } i = 1, \ldots, k(k=c) \quad \text{Equation 1}$$

Here, when $\bar{X}$ is the at least one logical X operator, X is the X operator, Z is the Z operator, I is an identity operator, i is an index of the entangled qubit, $r_i$ is an i-th row corresponding to the entangled qubit in an adjacency matrix corresponding to the graph state, k and c are the numbers of the entangled qubits, and n is the number of logical qubits among the plurality of qubits, j is a value defined as i+(n−c).

Desirably, the generating of a first stabilizer generator may include: generating an adjacency matrix indicating whether the plurality of qubits is adjacent to each other, based on the graph state; calculating a plurality of stabilizers which is configured by a Pauli operator and corresponds to each row of the adjacency matrix; and generating the first stabilizer generator including the plurality of calculated stabilizers.

Desirably, the first stabilizer generator may be calculated by Equation 2.

$$S = \begin{cases} X_i Z^{r_i} | I & (i = 1, \ldots, n-c) \\ X_i Z^{r_i} | Z_j & (i = n-c+1, \ldots, n) \\ Z_i | X_j & (i = n-c+1, \ldots, n) \end{cases} \quad \text{[Equation 2]}$$

Here, S is the first stabilizer operator, X is an operator used for a bit flip operator of a qubit, Z is an operator used for a phase flip operation of a qubit, I is an identity operator of a qubit, n is the number of logic qubits among the plurality of qubits, c is the number of the entangled qubits, j is a value defined as i−(n−c), and $r_i$ is an i-th row of the adjacency matrix.

Desirably, the quantum error correction code generating method may further include: generating a quantum error correction code corresponding to a plurality of qubits including the at least one entangled qubit, using the at least one logical X operator, the at least one logical Z operator, and the second stabilizer generator.

In order to achieve the above-mentioned object, a quantum error correction code generating apparatus using a graph state, includes: a graph unit which generates a graph state representing an adjacency relationship between a plurality of qubits including at least one entangled qubit; a first generator unit which generates a first stabilizer generator which corresponds to the graph state and is configured by a plurality of stabilizers for detecting errors of the plurality of qubits; and a second generator unit which generates at least one logical Z operator used for a phase flip operation of a codeword, at least one logical X operator used for a bit flip operation of a codeword, and a second stabilizer generator which is a sub set of the first stabilizer generator, based on the first stabilizer generator and the at least one entangled qubit.

Desirably, the second generator may determine at least one of the plurality of stabilizers which configures the first stabilizer generator as the at least one logical Z operator and generate the second stabilizer generator with a remainder, based on the at least one entangled qubit; and generate the at least one logical X operator using the at least one logical Z operator and the second stabilizer generator.

Desirably, the second generator may determine at least one stabilizer including an X operator used for a bit flip operation in a position corresponding to the at least one entangled qubit, among the plurality of stabilizers which configures the first stabilizer generator, as the at least one logical Z operator; and generate the second stabilizer generator configured by the remainder excluding the at least one logical Z operator.

Desirably, the second generator may generate at least one candidate operator in which the X operator included in the at least one logical Z operator is replaced with a Z operator used for a phase flip operation of a qubit; and generate the at least one logical X operator using a stabilizer including the Z operator in the same position as the at least one candidate operator in the second stabilizer generator and the at least one candidate operator.

Desirably, the first generator may generate an adjacency matrix indicating whether the plurality of qubits is adjacent to each other, based on the graph state; calculate a plurality of stabilizers which is configured by a Pauli operator and corresponds to each row of the adjacency matrix; and generate the first stabilizer generator including the plurality of calculated stabilizers.

Desirably, the first stabilizer generator may be calculated by Equation 3.

$$S = \begin{cases} X_i Z^{r_i} \mid I \ (i=1, \ldots, n-c) \\ X_i Z^{r_i} \mid Z_j \ (i=n-c+1, \ldots, n) \\ Z_i \mid X_j \ (i=n-c+1, \ldots, n) \end{cases} \quad \text{[Equation 3]}$$

Here, S is the first stabilizer operator, X is an operator used for a bit flip operator of a qubit, Z is an operator used for a phase flip operation of a qubit, I is an identity operator of a qubit, n is the number of logic qubits among the plurality of qubits, c is the number of the entangled qubits, j is a value defined as i−(n−c), and $r_i$ is an i-th row of the adjacency matrix.

Desirably, the quantum error correction code generating apparatus may further include: an ECC generating unit which generates a quantum error correction code corresponding to a plurality of qubits including the at least one entangled qubit, using the at least one logical X operator, the at least one logical Z operator, and the second stabilizer generator.

Advantageous Effects

According to the present invention, a quantum error correction code corresponding to a graph state to which entangled qubits is applied is generated so that the dimension of the quantum error correction code may be easily extended only by adding the entangled qubits.

Further, according to the present invention, the quantum error correction code which satisfies a quantum bound may be generated.

BEST MODE

Those skilled in the art may make various modifications to the present invention and the present invention may have various embodiments thereof, and thus specific embodiments will be illustrated in the drawings and described in detail in detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to accompanying drawings.

Figure 1:
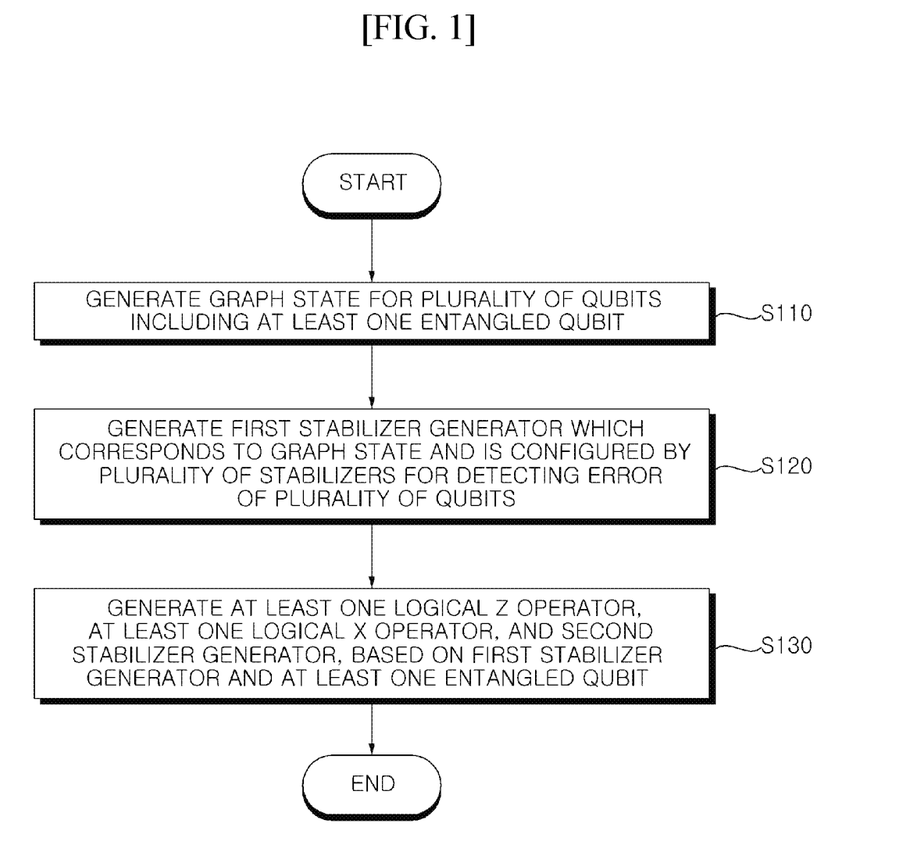
FIG. 1 is a flowchart illustrating a quantum error correction code generating method using a graph state according to an exemplary embodiment of the present invention.

FIG. 1 is a flowchart illustrating a quantum error correction code generating method using a graph state according to an exemplary embodiment of the present invention.

In step S110, the quantum error correction code generating apparatus generates a graph state representing an adjacency relationship between qubits for a plurality of qubits including at least one entangled qubit (ebit).

The qubit is a unit of quantum information and is used instead of a bit which is a unit of digital information of the related art. Further, the qubit may be represented by a linear superposition of two different quantum states. That is, the qubit may have a value of 0 or 1 and also simultaneously have the values of 0 and 1.

The entangled qubit refers to a qubit corresponding to a quantum entangled with other quantum and as values of two entangled qubits, a value of one qubit may be determined by a value of the other qubit.

Figure 4:
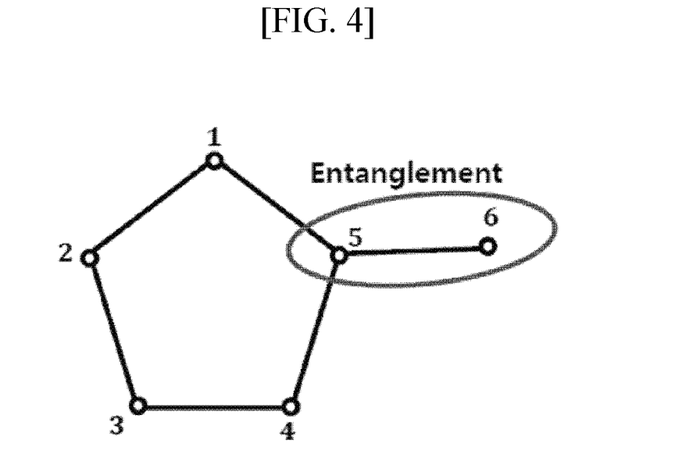
FIG. 4 is a view illustrating for explaining a graph state according to an exemplary embodiment of the present invention.
Figure 6:
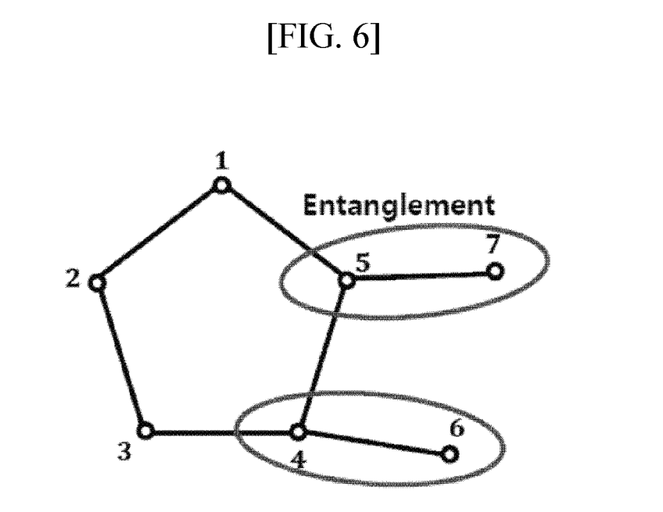
FIG. 6 is a view illustrating for explaining a graph state according to another exemplary embodiment of the present invention.

Therefore, the graph state is a method for representing states of a plurality of qubits by a graph. That is, each qubit corresponds to a vertex in the graph, and lines are connected between a pair of qubits which interact with each other. Referring to FIGS. 4 and 6, graph states for six and seven qubits are illustrated, respectively. Further, FIGS. 4 and 6 include one entangled qubit (a sixth qubit) and two entangled qubits (sixth and seventh qubits), respectively.

In this case, referring to FIG. 4, the total number of physical qubits is six, the number of logical qubits is five, and the number of entangled qubits is one. Further, referring to FIG. 6, the total number of physical qubits is seven, the number of logical qubits is five, and the number of entangled qubits is two.

In step S120, the quantum error correction code generating apparatus generates a first stabilizer generator which corresponds to the graph state and is configured by a plurality of stabilizers for detecting errors of the plurality of qubits.

The plurality of stabilizers may be configured by a plurality of Pauli operators (2×2 matrix). In this case, the Pauli operator may be one of an I operator which is an identity operator, an X operator which is a bit flip operator, a Y operator which is a bit and phase flip operator, and a Z operator which is a phase flip operator, as expressed in Equation 1.

$$I = \begin{bmatrix} 1 & 0 \\ 0 & 1 \end{bmatrix}, X = \begin{bmatrix} 0 & 1 \\ 1 & 0 \end{bmatrix}, Y = \begin{bmatrix} 0 & -i \\ -i & 0 \end{bmatrix}, Z = \begin{bmatrix} 1 & 0 \\ 0 & 1 \end{bmatrix} \quad \text{[Equation 1]}$$

Generally, a stabilizer of a graph state corresponding to the plurality of qubits may be calculated by the following Equation 2.

$$S_i = X_i Z^{r_i} \text{ for } i=1,\ldots,n \quad \text{Equation 2}$$

Here, $S_i$ is an i-th stabilizer, X is an X operator, Z is a Z operator, $r_i$ is a value of an i-th row of an adjacency matrix corresponding to a graph state, and n is the number of logic qubits.

In this case, the stabilizer is briefly represented for the purpose of convenience and a subscript means a position of the operator. That is, $X_i Z^{r_i}$ indicates that the X operator exists in a position corresponding to an i-th qubit and in the other positions, when a value of a corresponding row and column of the adjacency matrix is 1, Z exists and when the value is 0, I exists. For example, when i=2 and $r_i$={10100}, the stabilizer may be ZXZII.

However, a stabilizer of a graph state including an entangled qubit may be calculated by the following Equation 3.

$$S = \begin{cases} X_i Z^{r_i} \mid I \; (i=1,\ldots,n\text{-}c) \\ X_i Z^{r_i} \mid Z_j \; (i=n\text{-}c+1,\ldots,n) \\ Z_i \mid X_j \; (i=n\text{-}c+1,\ldots,n) \end{cases} \quad \text{[Equation 3]}$$

Here, $S_i$ is an i-th stabilizer, X is an X operator, Z is a Z operator, I is an identity operator, $r_i$ is a value of an i-th row of an adjacency matrix corresponding to a graph state, n is the number of logic qubits, c is the number of entangled qubits, and j is a value defined by i−(n−c).

That is, referring to FIG. 4, since n is 5 and c is 1, a stabilizer corresponding to first to fourth qubits is $X_i Z^{r_i} | I$, a stabilizer corresponding to a fifth qubit is $X_i Z^{r_i} | Z_j$, and a stabilizer corresponding to a sixth qubit is $Z_i | X_j$. In this case, the stabilizer corresponding to the sixth qubit may detect an error in a position corresponding to the sixth qubit which is an entangled qubit so that the stabilizer may be served as a stabilizer allocated to a receiving terminal.

Figure 5:
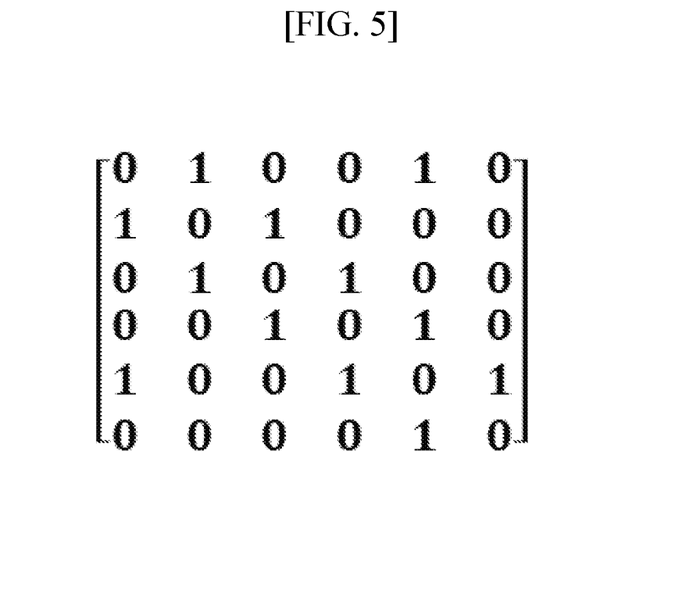
FIG. 5 is a view illustrating for explaining an adjacency matrix according to an exemplary embodiment of the present invention.

More specifically, referring to FIG. 4, a total of six qubits is illustrated in FIG. 4 and the sixth qubit is present as a qubit entangled with a fifth qubit. That is, the number n of logical qubits is 5 and the number c of entangled qubit is 1 since the entangled qubit is the sixth qubit. Further, referring to FIG. 5, FIG. 5 illustrates an adjacency matrix representing a relationship between individual qubits illustrated in FIG. 4 and adjacent qubits. That is, since the first qubit is adjacent to second and fifth qubits in FIG. 4, a first row of the adjacency matrix representing a relationship between the first qubit and other qubits may be represented by {0, 1, 0, 0, 1, 0}. Similarly, second to fifth rows of the adjacency matrix for second to fifth qubits may be represented.

Accordingly, with respect to the graph state of FIG. 4, when the adjacency matrix of FIG. 5 and Equation 3 are used, the stabilizer of the graph state may be calculated to be $S_1$=XZIIZ|I, $S_2$=ZXZII|I, $S_3$=IZXZI|I, $S_4$=IIZXZ|I, $S_5$=ZIIZX|Z, $S_6$=IIIIZ|X. In this case, a symbol may be used to distinguish an operator corresponding to a position of the sixth qubit which is an entangled qubit and an operator corresponding to a position of a normal qubit which is not entangled.

The quantum error correction code generating apparatus may generate a first stabilizer generator including the generated stabilizers. In this case, the first stabilizer generator is a set of stabilizers including a minimal stabilizer and is expressed by Equation 4.

$$S = \{S_1, S_2, \ldots, S_n\} \qquad \text{Equation 4}$$

In the meantime, the reason why the quantum error correction code generating apparatus calculates the stabilizer generator of the graph state is because the stabilizer generator of the graph state configures a maximal Abelian subgroup. The maximal Abelian subgroup may be a group in which all elements in a group are commutative with each other but are not commutative with elements outside the group.

In step S130, the quantum error correction code generating apparatus generates at least one logical Z operator used for a phase flip operation of a codeword, at least one logical X operator used for a bit flip operation of a codeword, and a second stabilizer generator which is a sub set of the first stabilizer generator, based on the generated first stabilizer generator and at least one entangled qubit.

For example, the quantum error correction code generating apparatus may generate at least one logical Z operator, at least one logical X operator, and the second stabilizer generator using a stabilizer corresponding to at least one entangled qubit among stabilizers included in the first stabilizer generator.

According to another exemplary embodiment, the quantum error correction code generating apparatus may generate at least one Z operator and the second stabilizer generator from the first stabilizer generator using at least one entangled qubit and generate at least one logical X operator using the generated at least one logical Z operator and second stabilizer generator.

That is, at least one logical Z operator may be a stabilizer corresponding to the at least one entangled qubit and the second stabilizer generator may include the remainder of the first stabilizer generators excluding a stabilizer corresponding to the at least one entangled qubit. Further, the at least one logical X operator may be generated from at least one logical Z operator and the first stabilizer generator.

In the meantime, a specific method for generating the at least one logical Z operator, the at least one logical X operator, and the second stabilizer generator may be described in more detail below.

According to another exemplary embodiment, the quantum error correction code generating apparatus determines at least one stabilizer generator including an X operator in a position corresponding to at least one entangled qubit, among a plurality of stabilizer generators included in the first stabilizer generator as at least one logical Z operator and generates the second stabilizer generator from the remainder.

That is, the quantum error correction code generating apparatus determines some of stabilizers included in the first stabilizer generator as at least one logical Z operator and generates the second stabilizer generator with the remainder, using the fact that the stabilizer generator of the quantum error correction code and at least one logical Z operator form the maximum Abelian subgroup.

More specifically, the quantum error correction code generating apparatus may determine at least one stabilizer including an X operator in a position corresponding to at least one entangled qubit, among the plurality of stabilizers included in the first stabilizer, as at least one logical Z operator. Further, the quantum error correction code generating apparatus may generate the second stabilizer generator with the remaining stabilizers.

In this case, the quantum error correction code generating apparatus determines the logical Z operator as described above to use a characteristic of the entangled qubit. Referring to the description of Equation 2, the stabilizer may include an X operator in the location corresponding to each qubit. When the stabilizer is determined as the logical Z operator to be changed, in the stabilizer including the X operator in a position corresponding to a qubit which is not the entangled qubit, a Z error generated in the position corresponding to the qubit may not be detected. However, when the X operator is included in the position corresponding to the entangled qubit, the Z error is not originally generated in the position corresponding to the entangled qubit while passing through a channel at a receiving terminal of a quantum communication, so that a problem in that the Z error is not detected does not occur. In this case, the reason why the Z error is not generated in the position corresponding to the entangled qubit is because a value of the entangled qubit is already determined by a value of other qubits entangled with the qubit.

For example, the quantum error correction code generating apparatus may determine IIIIZ|X including the X operator in the position corresponding to the sixth qubit which is an entangled qubit as a logical Z operator with respect to the first stabilizer generator $S_1$={XZIIZ|I, ZXZII|I, IZXZI|I, IIZXZ|I, ZIIZX|Z, IIIIZ|X} and generates the second stabilizer generator $S_2$={XZIIZ|I, ZXZII|I, IZXZI|I, IIZXZ|I, ZIIZX|Z} from the remainder. In this case, if a stabilizer IZXZI|I which includes an X operator in a position corresponding to a third qubit, rather than the sixth entangled qubit is determined as a logical Z operator, when the Z error is generated in the position corresponding to the third qubit, the error may not be detected.

According to still another exemplary embodiment, the quantum error correction code generating apparatus may generate the logical X operator from at least one logical Z operator and the second stabilizer generator.

That is, the quantum error correction code generating apparatus generates at least one candidate operator in which an X operator included in the determined at least one logical Z operator is replaced with the Z operator and generates at least one logical X operator using a stabilizer including a Z operator in the same position as the at least one candidate operator in the second stabilizer generator and the generated at least one candidate operator.

For example, the quantum error correction code generating apparatus may generate the candidate operator with IIIII|Z obtained by replacing an X operator in IIIIZ|X determined as the logical Z operator with the Z operator. In this case, the Z operator may be replaced with the I operator in the position corresponding to the fifth qubit of the candidate operator. Further, a logical X operator ZIIZX|I may be generated by multiplying a candidate operator IIIII|Z and a stabilizer ZIIZX|Z which includes a Z operator in the position corresponding to the sixth qubit similarly to the candidate operator in the second stabilizer generator. This is to use a characteristic that since the Z operator and the Z operator are multiplied to be an I operator, Z operators are offset.

According to still another exemplary embodiment, at least one logical X operator may be calculated by Equation 5.

$$\overline{X} = S_i \cdot I \mid Z_i \qquad \text{[Equation 5]}$$
$$= X_j Z^{r_i} \mid I \text{ for } i = 1, \ldots, k(k = c)$$

Here, when $\overline{X}$ is at least one logical X operator, $S_i$ is a stabilizer, X is an X operator, Z is a Z operator, I is an identity operator, i is an index of an entangled qubit, is an i-th row corresponding to an entangled qubit in an adjacency matrix corresponding to the graph state, k and c are the numbers of the entangled qubits, and n is the number of logical qubits among a plurality of qubits, j is a value defined as i+(n−c).

In this case, in Equation 5, $S_j$ may be a stabilizer including a Z operator in the same position as the candidate operator among stabilizers included in the second stabilizer generator and $I|Z_i$ may be a candidate operator. Further, the quantum error correction code generating apparatus multiplies the stabilizer and the candidate operator to finally generate a logical X operator.

That is, since the receiving terminal cannot directly encode the code, the quantum error correction code generating apparatus multiplies the candidate operator and the stabilizer including a Z operator in the same position as the candidate operator to offset the Z operator included in the logical X operator.

According to another exemplary embodiment, the quantum error correction code generating apparatus may generate a quantum error correction code corresponding to a plurality of qubits including at least one entangled qubit using at least one logical X operator, at least one logical Z operator, and the second stabilizer generator.

For example, the quantum error correction code generating apparatus may detect and restore an error generated while codewords corresponding to the plurality of qubits pass through a channel during a quantum communication process, using at least one logical X operator, at least one logical Z operator, and the second stabilizer generator.

That is, when there are c entangled qubits for n logical qubits, the quantum error correction code generating apparatus generates a code [[n, c, d; c]] to detect and correct a quantum error.

As described above, a quantum error correction code generating method using a graph state according to an exemplary embodiment of the present invention determines a stabilizer corresponding to an entangled qubit for a graph state to which entangled qubits is applied, as a logical Z operator and generates the stabilizer generator and the logical X operator, thereby easily generating a quantum error correction code and extending a dimension of the code without causing a problem in that the Z error in the position of the entangled qubit is not detected.

Figure 2:
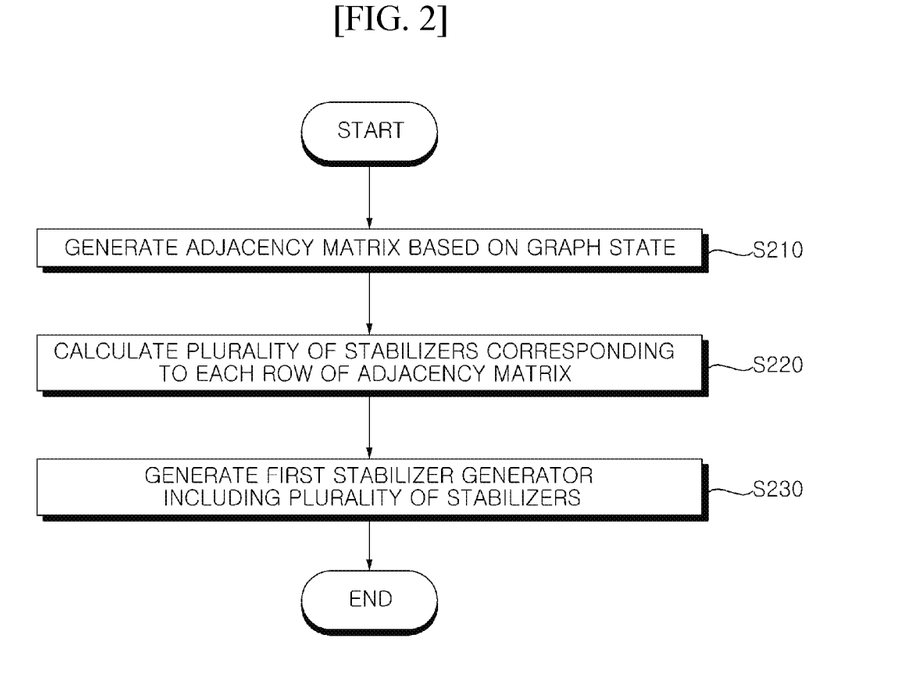
FIG. 2 is a flowchart illustrating a method for generating a first stabilizer generator according to an exemplary embodiment of the present invention.

FIG. 2 is a flowchart illustrating a method for generating a first stabilizer generator according to an exemplary embodiment of the present invention.

In step S210, the quantum error correction code generating apparatus generates an adjacency matrix indicating whether a plurality of qubits is adjacent to each other, based on the graph state.

In this case, the adjacency matrix may have the same number of rows and columns as the physical number of qubits and adjacency in the adjacency matrix may be represented to be 1 when the qubits are adjacent or 0 when the qubits are not adjacent. That is, when the physical number of qubits is six, the adjacency matrix may be a 6×6 matrix. In the meantime, it is considered that the qubit is not adjacent to the qubit itself. That is, the adjacency between the first qubit and the first qubit may be zero.

For example, referring to FIG. 4, since the first qubit is adjacent to the second and fifth qubits, a first row of the adjacency matrix may be represented by a value of {0, 1, 0, 0, 1, 0}. Since the second qubit is adjacent to the first and third qubits, a second row of the adjacency matrix may be represented by a value of {1, 0, 1, 0, 0, 0}. A result that generates the adjacency matrix by the same manner is illustrated in FIG. 5.

In step S220, the quantum error correction code generating apparatus calculates a plurality of stabilizers which is configured by a Pauli operator and corresponds to individual rows of the adjacency matrix.

For example, the quantum error correction code generating apparatus may calculate a plurality of stabilizers using an index i corresponding to each qubit of FIG. 4 and Equation 3.

In step S230, the quantum error correction code generating apparatus generates a first stabilizer generator including the plurality of calculated stabilizers.

For example, the quantum error correction code generating apparatus may generate a first stabilizer generator so as to include the plurality of calculated stabilizers. That is, the first stabilizer generator may be considered as a set having the plurality of stabilizers as elements.

According to another exemplary embodiment, the first stabilizer generator may be calculated by Equation 3.

That is, the quantum error correction code generating apparatus may calculate a stabilizer of the graph state including an entangled qubit using Equation 3 described above.

A method for generating a quantum error correction code for a graph state including two entangled qubits of FIG. 6 according to an exemplary embodiment of the present invention will be described below.

In this case, since the number of logical qubits is five and the number of entangled qubits is two, the quantum error correction code generating apparatus may generate a code [[5, 1, 3: 1]].

Figure 7:
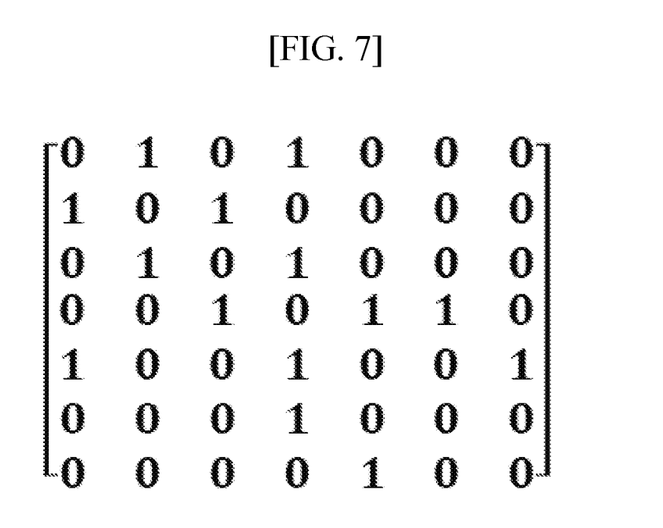
FIG. 7 is a view illustrating for explaining an adjacency matrix according to another exemplary embodiment of the present invention.

The quantum error correction code generating apparatus generates a first stabilizer generator corresponding to a graph state of FIG. 6 using FIG. 7 and Equation 3 as follows: $S_1$={XZIIZ|III, ZXZII|II, IZXZI|II, IIZXZ|ZI, ZIIZX|IZ, IIIZI|XI, IIIIZ|IX}. Further, in the first stabilizer generator, stabilizers IIIZI|XI and IIIIZ|IX corresponding to sixth and seventh qubits which are entangled qubits are determined as a logical $Z_1$ operator and a logical $Z_2$ operator.

Further, a second stabilizer generator $S_2$={XZIIZ|III, ZXZII|II, IZXZI|II, IIZXZ|ZI, ZIIZX|IZ} is generated using the remainder excluding the logical $Z_1$ operator and the logical $Z_2$ operator.

Further, a logical $X_1$ operator IIZXZ|III is generated by multiplying a candidate operator IIIII|ZI corresponding to the logical $Z_1$ operator IIIZI|XI and a stabilizer IIZXZ|ZI including a Z operator in the same position. Similarly, a logical $X_2$ operator ZIIZX|III is generated by multiplying a candidate operator IIIII|IZ corresponding to the logical $Z_2$ operator IIIIZ|IX and a stabilizer ZIIZX|IZ including a Z operator in the same position.

As described above, as the number of entangled qubits is increased by adding entangled qubits to the graph state, the quantum error correction code generating apparatus may extend the dimension of the code as much as the increased number.

Further, the quantum error correction code generating method using a graph state according to an exemplary embodiment of the present invention may easily generate a code which satisfies a quantum bound.

Figure 8:
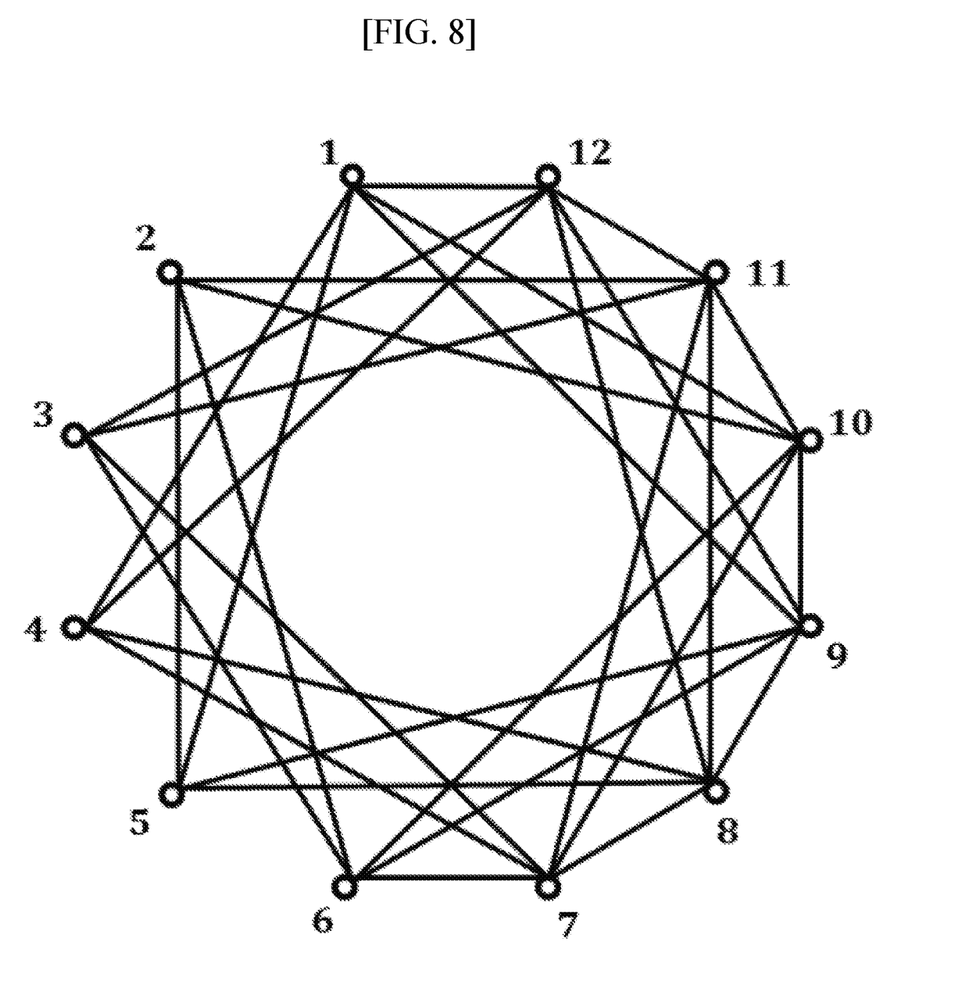
FIG. 8 is a view illustrating for explaining a quantum bound according to an exemplary embodiment of the present invention when n=12 and k=6.

For example, when four entangled quanta are added to an 8 ring graph, a code [[8, 4, 4; 4]] which satisfies a linear programming bound which is one of the most difficult bounds to be satisfied. Further, referring to FIG. 8, when n=12 and k=8, six entangled quanta are added to a graph of FIG. 8 which is known to have the largest minimum distance to generate a code [[12, 6, 5: 6]].

Figure 3:
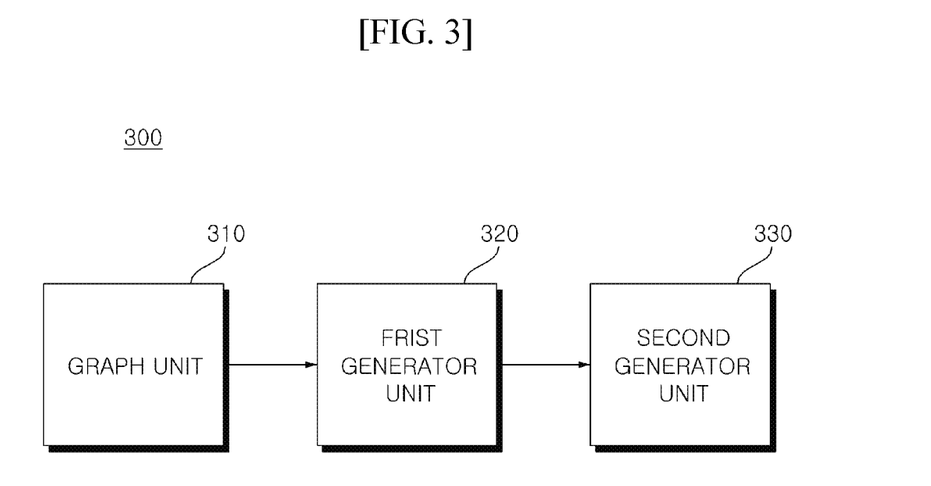
FIG. 3 is a view illustrating a quantum error correction code apparatus using a graph state according to an exemplary embodiment of the present invention.

FIG. 3 is a view illustrating a quantum error correction code generating apparatus using a graph state according to an exemplary embodiment of the present invention.

Referring to FIG. 3, a quantum error correction code generating apparatus 300 using a graph state according to an exemplary embodiment of the present invention includes a graph unit 310, a first generator unit 320, and a second generator unit 330. Further, the quantum error correction code generating apparatus 300 may further include an ECC generator (not illustrated) as an option. In the meantime, the quantum error correction code generating apparatus 300 using a graph state may be mounted in a computer, a smart phone, and a tablet.

The graph unit 310 generates a graph state representing an adjacency relationship between a plurality of qubits including at least one entangled qubit.

The first generator unit 320 generates a first stabilizer generator which corresponds to a graph state and is configured by a plurality of stabilizers for detecting errors of the plurality of qubits.

According to another exemplary embodiment, the first generator unit 320 may generate an adjacency matrix indicating whether the plurality of qubits is adjacent to each other, based on the graph state and generate a first stabilizer generator which is configured by a Pauli operator, calculates a plurality of stabilizers corresponding to each row of the adjacency matrix, and includes the plurality of calculated stabilizers.

According to another exemplary embodiment, the first stabilizer generator may be calculated by Equation 3.

The second generator unit 330 generates at least one logical Z operator used for a phase flip operation of a codeword, at least one logical X operator used for a bit flip operation of a codeword, and a second stabilizer generator which is a sub set of the first stabilizer generator, based on the generated first stabilizer generator and at least one entangled qubit.

According to another exemplary embodiment, the second generator unit 330 determines at least one of the plurality of stabilizers which configures the first stabilizer generator as at least one logical Z operator, generates the second stabilizer generator with the remainder, and generates at least one logical X operator using the at least one logical Z operator and the second stabilizer generator, based on at least one entangled qubit.

According to still another exemplary embodiment, the second generator unit 330 determines at least one stabilizer including an X operator used for a bit flip operation in a position corresponding to at least one entangled qubit, amoung the plurality of stabilizers which configures the first stabilizer generator, as at least one logical Z operator and generates a second stabilizer generator configured by the remainder excluding the at least one logical Z operator.

According to still another exemplary embodiment, the second generator unit 330 generates at least one candidate operator in which an X operator included in at least one logical Z operator is replaced with a Z operator used for a phase flip operation of a qubit and generates at least one logical X operator using the stabilizer including a Z operator in the same position as the at least one candidate operator in the second stabilizer generator and the at least one candidate operator.

Finally, the ECC generator (not illustrated) generates a quantum error correction code corresponding to the plurality of qubits including at least one entangled qubit using the at least one logical X operator, at least one logical Z operator, and the second stabilizer generator.

The above-described exemplary embodiments of the present invention may be created by a computer-executable program and implemented in a general use digital computer which operates the program using a computer-readable medium. The computer-readable recording medium includes a magnetic storage medium (for example, a ROM, a floppy disk, and a hard disk) and an optical reading medium (for example, CD-ROM and a DVD).

For now, the present invention has been described with reference to the exemplary embodiments. It is understood to those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

The invention claimed is:

1. A quantum error correction code generating method using a graph state, the quantum error correction code generating method executed by an electronic device including a processor, the quantum error correction code generating method comprising:
generating a graph state representing an adjacency relationship between a plurality of qubits including an entangled qubit;
generating a first stabilizer generator which corresponds to the graph state received from a graph unit and is configured by a plurality of stabilizers for detecting errors of the plurality of qubits; and
generating a logical Z operator used for a phase flip operation of a codeword, a logical X operator used for a bit flip operation of the codeword, and a second stabilizer generator which is a sub set of the first stabilizer generator, based on the first stabilizer generator and the entangled qubit,
wherein the generating of the second stabilizer generator includes:
based on the entangled qubit, determining a first stabilizer of the plurality of stabilizers as the logical Z operator and generating the second stabilizer generator comprising the other stabilizers excluding the first stabilizer from the plurality of stabilizers; and
generating the logical X operator using the logical Z operator and the second stabilizer generator,
wherein the first stabilizer, as the logical Z operator, includes an X operator used for a bit flip operation of a qubit, and
wherein the X operator of the first stabilizer is placed in the first stabilizer at a position corresponding to the entangled qubit placed in the graph state; and
transmitting the codeword to a receiver.

2. The quantum error correction code generating method of claim 1, wherein the generating of the logical X operator includes:
generating a candidate operator in which the X operator included in the logical Z operator is replaced with a Z operator used for a phase flip operation of a qubit; and
generating the logical X operator using the candidate operator and a second stabilizer including the Z operator placed in the same position in the second stabilizer generator as the replaced Z operator placed in the candidate operator.

3. The quantum error correction code generating method of claim 2, wherein the logical X operator is calculated by Equation 1:

$$\bar{X} = X_j Z^{r_i} I \text{ for } i=1, \ldots, k(k=c) \quad \text{Equation 1}$$

where X is the logical X operator, X is the X operator, Z is the Z operator, I is an identity operator, i is an index of the entangled qubit, $r_i$ is an i-th row corresponding to the entangled qubit in an adjacency matrix corresponding to the graph state, k and c are the numbers of the entangled qubits, and n is the number of logical qubits among the plurality of qubits, j is a value defined as i+(n−c).

4. The quantum error correction code generating method of claim 1, wherein the generating of a first stabilizer generator includes:
generating an adjacency matrix indicating whether the plurality of qubits is adjacent to each other, based on the graph state;
calculating the plurality of stabilizers which is configured by a Pauli operator and corresponds to each row of the adjacency matrix; and
generating the first stabilizer generator including the plurality of stabilizers.

5. The quantum error correction code generating method of claim 4, wherein the first stabilizer generator is calculated by Equation 2:

$$S = \begin{cases} X_i Z^{r_i} \mid I & (i = 1, \ldots, n\text{-}c) \\ X_i Z^{r_i} \mid Z_j & (i = n\text{-}c + 1, \ldots, n) \\ Z_i \mid X_j & (i = n\text{-}c + 1, \ldots, n) \end{cases} \quad [\text{Equation 2}]$$

where S is the first stabilizer operator, X is the X operator used for a bit flip operation of a qubit, Z is the Z operator used for the phase flip operation of a qubit, I is the identity operator of a qubit, n is the number of logic qubits among the plurality of qubits, c is the number of the entangled qubits, j is a value defined as i−(n−c), and $r_i$ is an i-th row of the adjacency matrix.

6. The quantum error correction code generating method of claim 1, further comprising:
generating a quantum error correction code corresponding to the plurality of qubits, using the logical X operator, the logical Z operator, and the second stabilizer generator.

7. A quantum error correction code generating apparatus using a graph state, the quantum error correction code generating apparatus comprising a processor, wherein said processor is configured to:
generate a graph state representing an adjacency relationship between a plurality of qubits including an entangled qubit;
generate a first stabilizer generator which corresponds to the graph state received from a graph unit and is configured by a plurality of stabilizers for detecting errors of the plurality of qubits; and
generate a logical Z operator used for a phase flip operation of a codeword, a logical X operator used for a bit flip operation of the codeword, and a second stabilizer generator which is a sub set of the first stabilizer generator, based on the first stabilizer generator and the entangled qubit,
wherein the processor is configured to
based on the entangled qubit, determine a first stabilizer of the plurality of stabilizers as the logical Z operator and generate the second stabilizer generator comprising the other stabilizers excluding the first stabilizer from the plurality of stabilizers; and
generate the logical X operator using the logical Z operator and the second stabilizer generator,
wherein the first stabilizer, as the logical Z operator, includes an X operator used for a bit flip operation of a qubit,
wherein the X operator of the first stabilizer is placed in the first stabilizer at a position corresponding to the entangled qubit placed in the graph state, and
transmitting the codeword to a receiver.

8. The quantum error correction code generating apparatus of claim 7, wherein the processor is configured to:
generate candidate operator in which the X operator included in the logical Z operator is replaced with a Z operator used for the phase flip operation of a qubit; and
generate the logical X operator using the candidate operator and a second stabilizer including the Z operator placed in the same position in the second stabilizer generator as the replaced Z operator placed in the candidate operator.

9. The quantum error correction code generating apparatus of claim 7, wherein the processor is configured to:
generate an adjacency matrix indicating whether the plurality of qubits is adjacent to each other, based on the graph state;
calculate the plurality of stabilizers which is configured by a Pauli operator and corresponds to each row of the adjacency matrix; and
generate the first stabilizer generator including the plurality of stabilizers.

10. The quantum error correction code generating apparatus of claim 9, wherein the first stabilizer generator is calculated by Equation 3:

$$S = \begin{cases} X_i Z^{r_i} \mid I & (i = 1, \ldots, n\text{-}c) \\ X_i Z^{r_i} \mid Z_j & (i = n\text{-}c + 1, \ldots, n) \\ Z_i \mid X_j & (i = n\text{-}c + 1, \ldots, n) \end{cases} \quad [\text{Equation 3}]$$

where S is the first stabilizer operator, X is the X operator used for a bit flip operation of a qubit, Z is the Z operator used for the phase flip operation of a qubit, I is an identity operator of a qubit, n is the number of logic qubits among the plurality of qubits, c is the number of the entangled qubits, j is a value defined as i−(n−c), and $r_i$ is an i-th row of the adjacency matrix.

11. The quantum error correction code generating apparatus of claim 7, the processor is configured to:
generate a quantum error correction code corresponding to the plurality of qubits, using the logical X operator, the logical Z operator, and the second stabilizer generator.

* * * * *